(12) United States Patent
Whalen et al.

(10) Patent No.: US 7,240,627 B1
(45) Date of Patent: Jul. 10, 2007

(54) CROP DEBRIS CLEARING DEVICE

(75) Inventors: Patrick Whalen, Colchester, IL (US); Stephen E. Cerven, Colchester, IL (US); Derek A. Litchfield, Macomb, IL (US)

(73) Assignee: Yetter Manufacturing Company, Colchester, IL (US)

( * ) Notice: Subject to any disclaimer, the term of this patent is extended or adjusted under 35 U.S.C. 154(b) by 53 days.

(21) Appl. No.: 10/937,932

(22) Filed: Sep. 10, 2004

(51) Int. Cl.
*A01B 15/16* (2006.01)
*A01B 21/00* (2006.01)
*A01B 49/04* (2006.01)
*A01C 5/00* (2006.01)
*A01C 13/00* (2006.01)

(52) U.S. Cl. ............... 111/140; 111/164; 111/167; 111/193; 172/574; 172/575; 172/584; 172/603; 172/604

(58) Field of Classification Search ............... 111/139, 111/140, 144, 164, 165, 166, 167, 191, 192, 111/193; 172/574, 575, 603, 604, 584
See application file for complete search history.

(56) References Cited

U.S. PATENT DOCUMENTS

| | | | |
|---|---|---|---|
| 1,873,128 A * | 8/1932 | Johnson | 172/157 |
| 3,244,237 A * | 4/1966 | Keplinger et al. | 172/603 |
| 3,718,191 A * | 2/1973 | Williams | 172/196 |
| 4,098,349 A * | 7/1978 | Jilani | 172/555 |
| 4,099,576 A * | 7/1978 | Jilani | 172/555 |
| 4,187,916 A * | 2/1980 | Harden et al. | 172/146 |
| 4,295,532 A * | 10/1981 | Williams et al. | 172/184 |
| 4,607,705 A * | 8/1986 | Tebben | 172/430 |
| 4,815,544 A * | 3/1989 | Good | 172/430 |
| 4,947,770 A | 8/1990 | Johnston | |
| 4,986,200 A | 1/1991 | Johnston | |
| 5,346,020 A * | 9/1994 | Bassett | 172/540 |
| 5,497,717 A * | 3/1996 | Martin | 111/191 |
| 5,497,836 A * | 3/1996 | Groff | 172/555 |
| 5,517,932 A * | 5/1996 | Ott et al. | 111/193 |
| 5,660,126 A * | 8/1997 | Freed et al. | 111/140 |
| 5,704,430 A * | 1/1998 | Smith et al. | 172/29 |
| 5,887,664 A | 3/1999 | Whalen et al. | |
| 6,279,666 B1 | 8/2001 | Nikkel et al. | |
| 6,701,856 B1 * | 3/2004 | Zoske et al. | 111/121 |
| 6,776,107 B1 * | 8/2004 | Shoup | 111/140 |

OTHER PUBLICATIONS

Kinze Brochure.

* cited by examiner

*Primary Examiner*—Christopher J. Novosad
(74) *Attorney, Agent, or Firm*—Dennis M. McWilliams; Barnes & Thornburg LLP

(57) ABSTRACT

A residue coulter apparatus that cleanly severs and clears crop debris from a planting row, causing minimal disturbance to the soil. The residue coulter apparatus comprises a pair of flat discs each having a plurality of back swept shark type teeth extending about their periphery. The teeth include a double beveled cutting edge on the outer edge of the teeth adapted to sever residue from the field. The clearing discs are oriented substantially vertical to the ground. Two clearing discs are used in combination to clear a pathway for planting seed. The clearing discs are angled toward each other so that the leading edges of the clearing discs are pointed in a toe-in orientation. The present design effectively removes crop debris without over discharge and causes minimal soil disturbance.

20 Claims, 7 Drawing Sheets

CROP DEBRIS CLEARING DEVICE

BACKGROUND

This invention relates to crop debris clearing devices and more particularly to a novel and improved arrangement using substantially flat rotatable clearing discs each having a plurality of teeth extending from its periphery that are adapted to completely sever crop residue for easier removal.

By way of background but not limitation, residue coulters typically include a pair of concave discs opposing each other and mounted at conveying angles. The residue coulters are adapted to engage the soil to cut and plow residue out from in front of the planter. Residue coulters typically are overly aggressive and cause extensive soil tillage, reducing the effectiveness of the planter. Extensive soil tillage is undesirable because excessive movement of the soil can increase erosion. The increased use of low-till and no-till farming methods has created the need for apparatus that can be attached to farm implements for clearing debris such as mulch and plant stalks from the field, particularly during planting of a row crop such as corn. In order to facilitate the proper emergence of corn plants the corn seeds are required to be planted at a precise depth and properly spaced. The depth of the planting of the seed is controlled by wheels of the planter unit. The presence of corn stalks or other debris in the row line during the planting operation can change the elevation of the wheels and effect the accuracy of the seeding.

In view of the above, it should be appreciated that there is a need for a residue coulter that cleanly severs and clears crop debris from the planting row while causing minimal disturbance to the soil.

SUMMARY

The invention may be described as a novel and improved residue coulter apparatus that cleanly severs and clears crop debris from a planting row, causing minimal disturbance to the soil. In the preferred embodiment, the residue coulter apparatus comprises a pair of flat discs each having a plurality of back swept teeth extending about their periphery. The teeth include a cutting edge beveled on both sides and adapted to sever residue from last year's crop. The clearing discs are oriented substantially vertical to the ground. Two clearing discs are used in combination to clear a pathway for planting seed. The clearing discs are located on opposite sides of the planter and are angled toward each other so that the leading edges of the clearing discs are pointed in a toe-in orientation. The present design effectively removes crop debris and causes minimal soil disturbance.

Other features and advantages of the disclosure will be set forth in part in the description which follows and the accompanying drawings, wherein the embodiments of the disclosure are described and shown, and in part will become apparent upon examination of the following detailed description taken in conjunction with the accompanying drawings.

BRIEF DESCRIPTION OF THE DRAWINGS

The above mentioned and other features of this disclosure and the manner of obtaining them will become more apparent and the disclosure will be best understood by reference to the following description of embodiments of the disclosure taken in conjunction with the accompanying drawings in which.

DETAILED DESCRIPTION

While the present disclosure will be described hereinafter with reference to the accompanying drawings, in which a particular embodiment is shown, it is to be understood at the outset that persons skilled in the art may modify the disclosure herein described while still achieving the desired result. Accordingly, the description that follows is to be understood as a broad informative disclosure directed to persons skilled in the appropriate art and not as limitations on the present disclosure.

Figure 1:
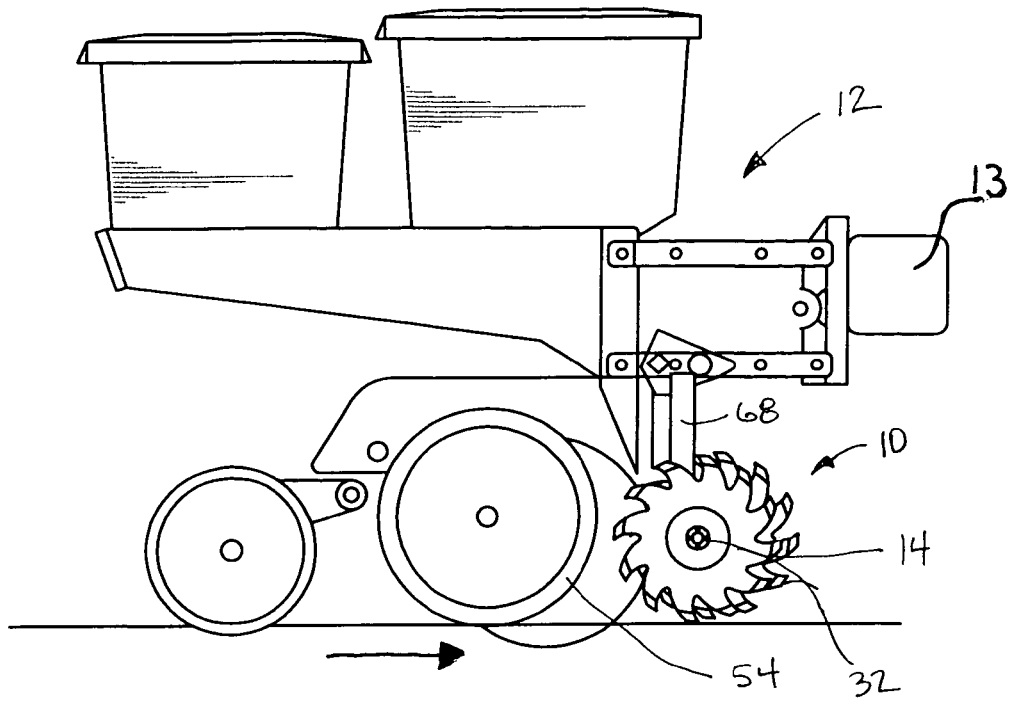
FIG. 1 is a side view of a crop debris clearing device attached to a planter.

As illustrated in the drawings, FIG. 1 illustrates a residue coulter 10 connected in front of a crop planter 12 in accordance with the present disclosure. The entire arrangement can be connected to a tool bar 13, which, in turn, is connected to a tractor (not shown). The residue coulter 10 of the present invention provides effective residue removal from the planting row while causing minimal soil disturbance. The residue coulter 10 also provides for superior soil depth control by permitting clearing discs 14 to be positioned closer to gauge wheels 54.

Figure 2:
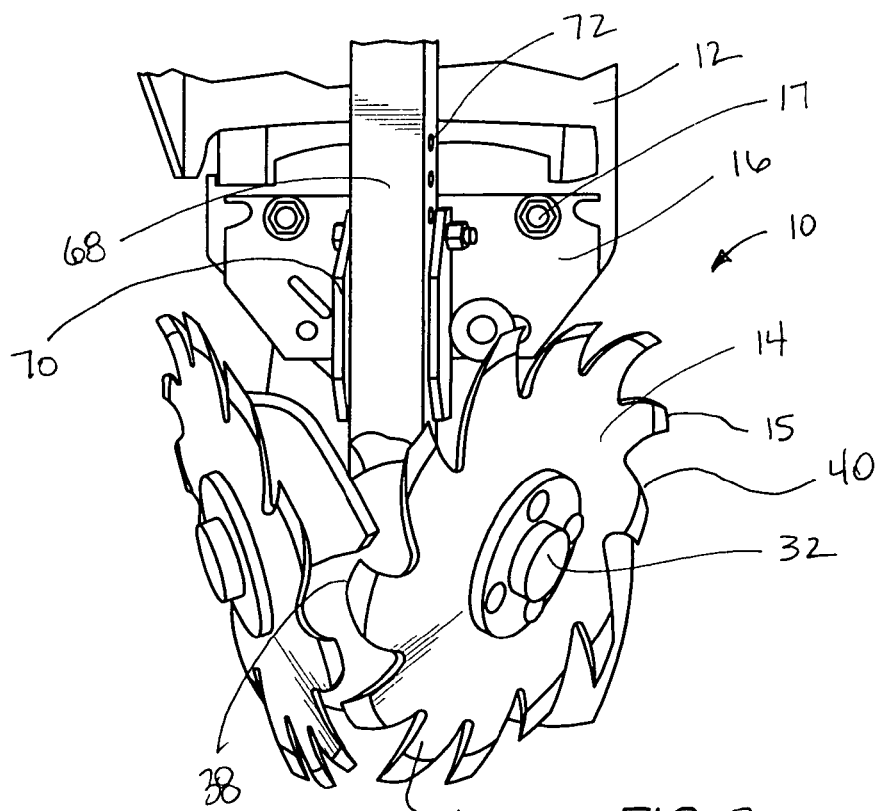
FIG. 2 is a front perspective view of a portion of the crop debris clearing device.
Figure 3:
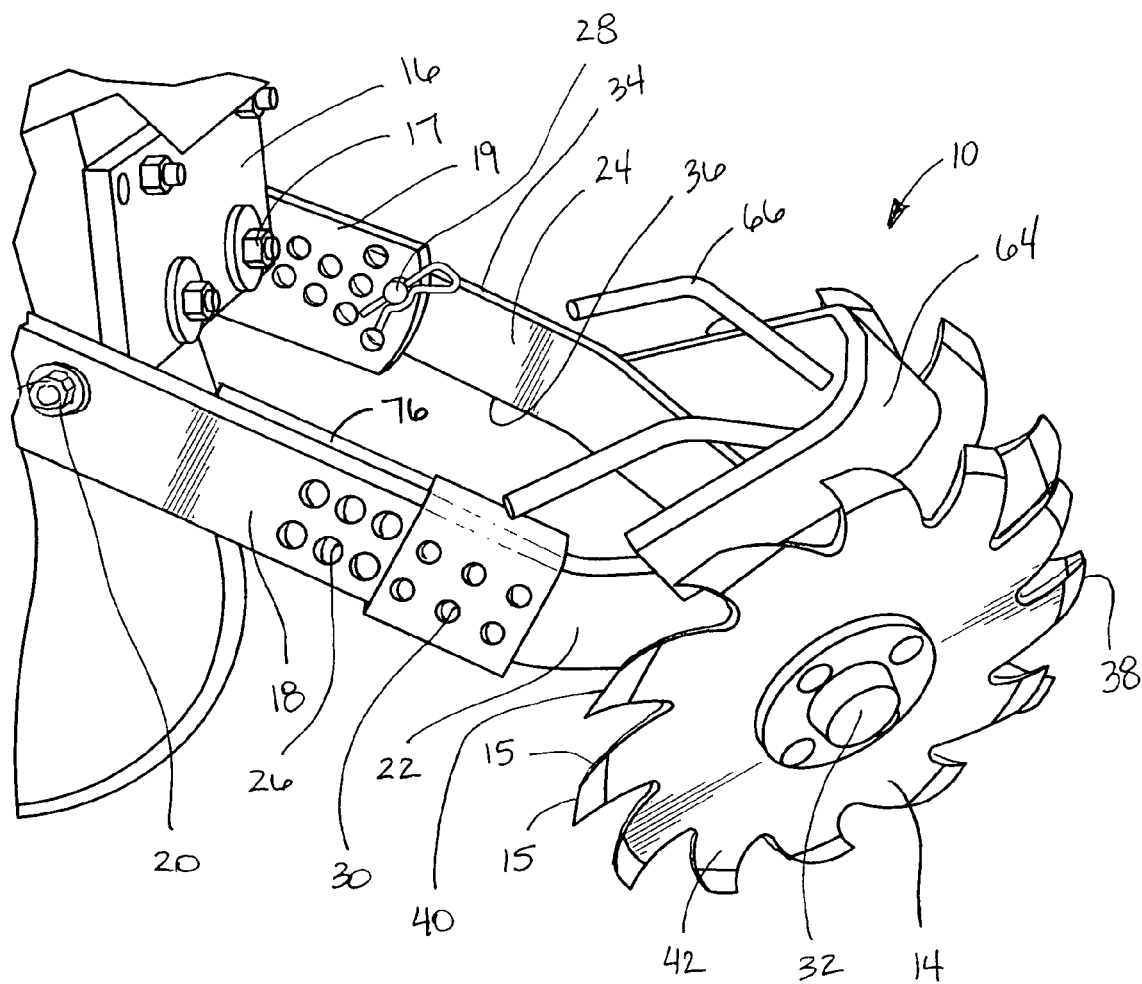
FIG. 3 is a perspective view of a portion of the crop debris clearing device.

The clearing discs 14 used with the residue coulter 10 of the present invention completely sever residue with minimal soil disruption. The clearing discs 14 of the residue coulter 10, as shown in FIGS. 1 and 2, are operated in a substantially vertical orientation with respect to the ground and provide desirable residue removal with the least occurrence of soil engagement. The clearing discs 14 further include sharp cutting edges 15 that completely sever hard to remove residue such as BT corn hybrids, and bio-tech corn hybrids, such as rootworm resistant corn. The residue coulter 10 is connected to the leading edge of the planter 12 by use of a mount 16. It should be understood that farm implements may have many planters 12 for simultaneously planting many rows of crops. The configuration of the mounting brackets 16 used to attach the residue coulter 10 to the planter 14 varies depending upon the make and model of the planter 12 as can be seen in FIGS. 2 and 3. Bolts 17 can be used to secure the mount 16 to the front of the planter 12. Connected to the mount 16 are a pair of outwardly extending first and second brackets 18, 19 that are connected to the mount 16 by use of bolts 20, as shown in FIG. 3. Connected to the first and second brackets 18, 19 are a pair of inwardly inclined first and second arms 22, 24. The first and second brackets 18, 19 in combination with the first and second arms 22, 24 form a support frame or harness.

The first and second brackets 18, 19 include a plurality of apertures 26 that are adapted to accept a set of pins 28, as shown in FIG. 3. The first and second arms 22, 24 also include a plurality of apertures 30 that are adapted to accept the pins 28. Alignment of the apertures 26 of the first and second brackets 18, 19 with the apertures 30 of the first and second arms 22, 24 permit the installation of the pins 28. The pins 28 retain the first and second arms 22, 24 to the first and second brackets 18, 19. Repositioning the pins 28 permits variable adjustment of the position of the clearing discs 14 with respect to the planter 12. The apertures 26, 30 permit vertical and horizontal adjustment of the clearing discs 14 to control soil contact.

Figure 6:
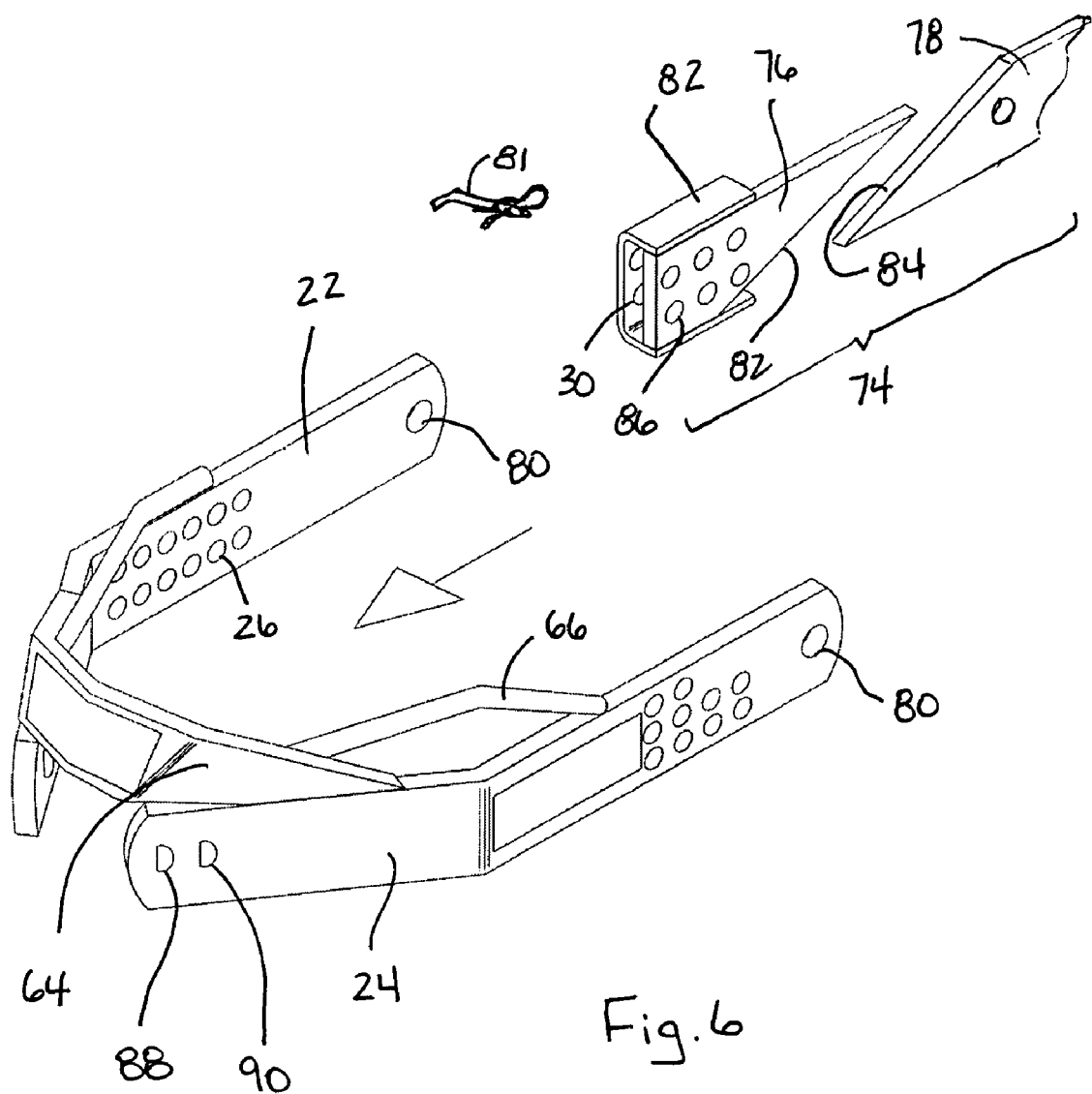
FIG. 6 is a perspective view of the crop clearing device with the clearing discs removed.

The first and second brackets 18, 19 in combination with the first and second arms 22, 24, permit telescopic adjustment of the bracket arrangement. Adjustment of the clearing discs 14 is also accomplished by use of an adjustment slide mechanism 74, as shown in FIG. 6. The adjustment slide mechanism 74 utilizes an inclined plate 76 that is adapted to be slid along a fixed inclined bracket 78 to raise or lower the clearing discs 14. The first and second arms 22, 24 of the mounting bracket include apertures 80 to permit the arms 22, 24 to be pivotally mounted so that the arms can pivot with respect to the fixed inclined bracket 78. The inclined plate 76 is secured to the first arm 22 by use of a unshaped coupler 82 and a pin 81. To adjust the elevation of the first arm 22, the inclined plate 76 is slid along the first arm 22, which in turn causes an inclined surface 82 of the inclined plate 76 to slide along an inclined surface 84 of the inclined bracket 78. The inclined plate 76 also include a plurality of apertures 86 that are adapted to accept the pin. Once the desired height of the first arm 22 is reached, the coupler 82 is aligned so that one or more apertures 26, 30, 86 of the first arm 22, the inclined plate 76 and coupler 82 are aligned to permit the installation of the pin.

Figure 11:
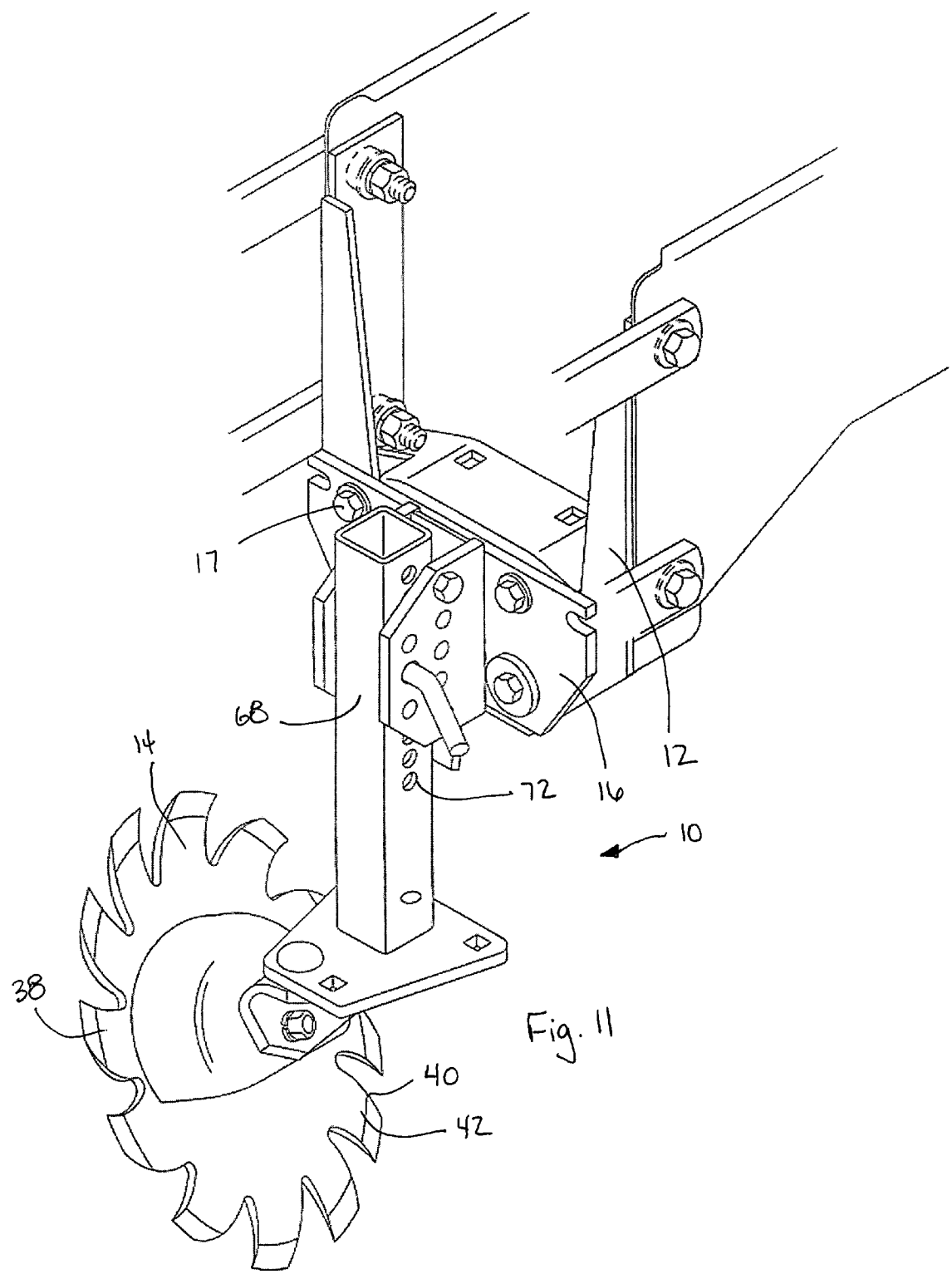
FIG. 11 is a perspective view of the crop debris clearing device operating with a single clearing disc.

FIG. 2 illustrates an alternate embodiment of a bracket arrangement to mount the clearing discs 14 to a crop planter 12. The clearing discs 14 are secured to the planter 12 by use of a vertical post 68. The vertical post 68 is secured to the mount 16 by use of a bracket 70. The vertical post 68 includes a plurality of apertures 72 that permit the repositioning of the vertical post 68 with respect to the bracket 70 to raise and lower the clearing discs 14 with respect to the soil. FIG. 11 illustrates the use of a single clearing disc 14 with the alternate bracket arrangement. Use of a single clearing disc 14 is desirable under certain crop clearing conditions.

The clearing discs 14, as shown in FIG. 3, are rotatably connected at the leading end of the first and second arms 22, 24, as shown in FIG. 3. The clearing discs 14 are journaled for rotation utilizing a hub arrangement 32 that includes internal bearings and are attached to axles utilizing a construction known to those skilled in the art. The clearing discs 14 are positioned in a substantially vertical orientation, with a deviation from vertical from about 8 degrees to about 10 degrees. The slight pitch of the clearing discs 14 permit sufficient removal of debris from the planting row. The use of a modest clearing disc pitch results in significantly less disturbance of the soil and reduces the distance the debris is removed from the planting row.

The first and second arms 22, 24 include a top edge 34 and a spaced apart bottom edge 36, as shown in FIG. 3. The first and second arms 22, 24 are angled inward such that the top edge 34 of the arms 22, 24 extend outwardly further than the bottom edge 36. The first and second arms 22, 24 are also angled inward toward one another such that the clearing discs 14, when mounted, have a toe-in orientation. The clearing discs 14 of the residue coulter 10, when attached to the first and second arms 22, 24, have an overall leading edge 38 that is positioned inward of the overall trailing edge 40 of the clearing discs 14 forming a toe-in configuration. The first and second arms 22, 24 each include first and second apertures 88, 90 that are adapted to accept the hub arrangement 32 of the clearing discs 14, as shown in FIG. 6. The incorporation of two apertures 88, 90 permit the installation of the clearing discs 14 in several configurations, which is desirable when using the discs 14 in various soil conditions and with various types of crop residue.

Figure 7:
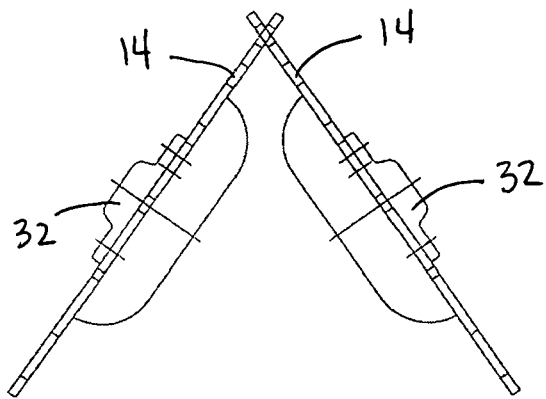
FIG. 7 is a top view of the clearing discs in an intersecting configuration.
Figure 8:
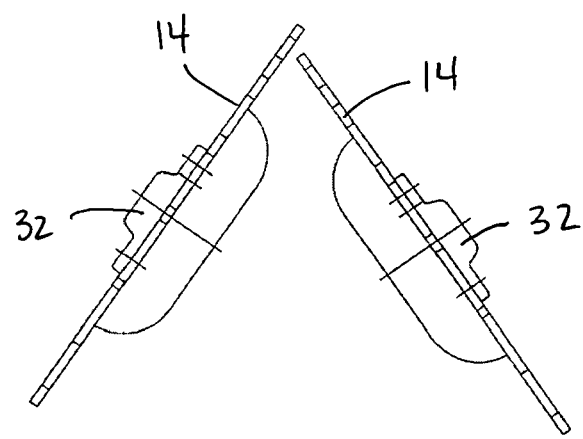
FIG. 8 is a top view of the clearing discs in an offset configuration.
Figure 9:
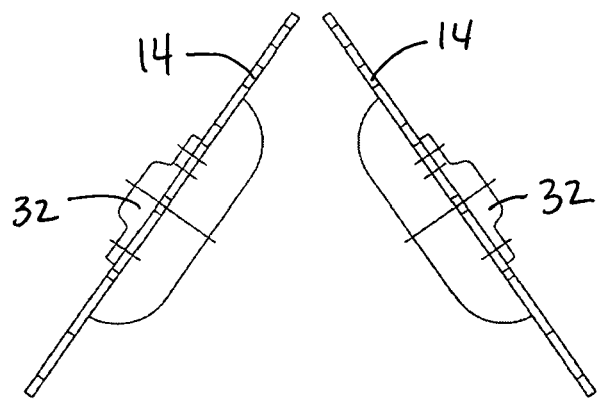
FIG. 9 is a top view of the clearing discs in a spaced apart configuration.

FIGS. 7–9 illustrate three separate orientations that can be implemented by altering the position of the clearing discs 14 on the first and second arms 22, 24. FIG. 7 illustrates the clearing discs 14 in an intersecting configuration. To set up this configuration, the clearing discs 14 are mounted to the forward leading apertures 88 on the first and second arms 22, 24. FIG. 8 illustrates the clearing discs 14 in an offset configuration. To set up the offset configuration the left clearing disc 14 is mounted to the forward aperture 88 on the second arm 24 and the right clearing disc 14 is mounted to the rearward aperture 90 on the first arm 24. FIG. 9 illustrates the clearing discs 14 in a spaced apart configuration, which may be desirable when clearing away heavier debris, such as corn stalks. To set up the spaced apart configuration both clearing discs 14 are mounted to the rearward apertures 90 on the first and second arms 22, 24.

Figure 5:
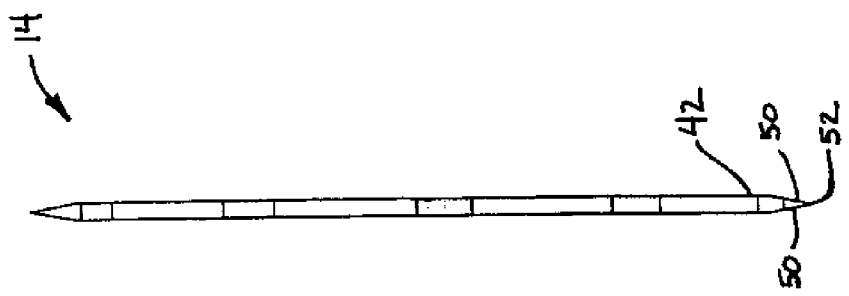
FIG. 5 is an end view of the clearing disc, shown in FIG. 4.
Figure 4:
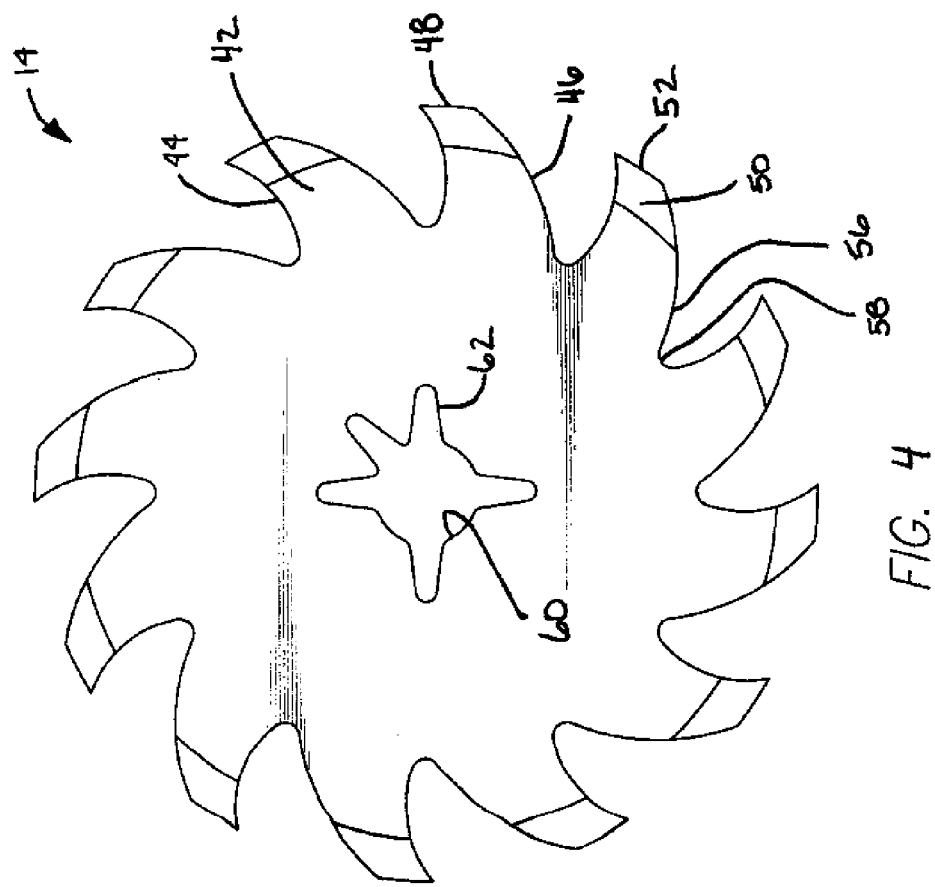
FIG. 4 is a side elevational view of a clearing disc.

The clearing discs 14, as shown in FIGS. 4 and 5, lie in a substantially flat plane and define a plurality of teeth 42 that surround the periphery of the clearing discs 14. The teeth 42 of the clearing discs 14 each include a curved leading edge 44, a curved trailing edge 46 and a substantially linear cutting edge 48 forming a crown, interconnecting the leading edge 44 to the trailing edge 46. As seen in, for example, FIG. 4 cutting edge 48 is substantially perpendicular to a radius of disc 14. The side surfaces of each tooth 42 include at least one beveled surface to define a cutting edge 48 on the top of teeth 42. The cutting edge 48 is used to sever the crop residue. The backward slope of the teeth 42 in combination with the cutting edges 48 on each tooth 42 are used to grab, completely sever and relocate crop residue from the planting row. The tooth's engagement with the ground is nearly vertical with respect to the soil due to the overall orientation of the clearing discs 14. While it has been found that positioning the clearing discs 14 within ten degrees of vertical to be effective, broader angles may also be utilized and are within the scope of the present invention. The design of the teeth 42 permits one of the cutting edges 48 to be in contact with the soil surface at all times to cleanly cut residue with minimal soil disturbance, creating the ideal growing environment for optimum emergence in a variety of cropping practices.

The teeth 42 are separated by a gap 56 that provides a space to permit the clearing discs to engage and retain the crop residue long enough to relocate the residue from the planting row. The gap 56 formed between teeth 42 is defined by the trailing edge 46 of a first tooth 42 and the leading edge 44 of a second tooth 42. The leading edge 44, the second tooth 42 and the trailing edge 46 of the first tooth 42 converge to form a curvilinear valley 58. The valley 58 of the clearing disc 14 is curved to prevent debris from becoming wedged between the teeth 42 as would happen if the valley were V shaped.

The residue coulter 10 further includes a tie bar 64, best shown in FIG. 3, that is positioned adjacent to and between the clearing discs 14. The tie bar 64 is adapted to secure the first and second arms 22, 24 together by use of fasteners or by a more permanent means, such as welding. The tie bar 64 retains the orientation of the first and second arms 22, 24. As a means of deflection, a pair of deflection rods 66 are used to deflect larger pieces of debris and prevent debris from re-entering the planting row. The deflection rods 66 also serve as a handle to permit the user to raise the clearing disc 14 when making height adjustments or removing debris stuck in the clearing discs 14.

The clearing discs 14 also include an aperture 60 that is positioned at the center of each clearing disc 14. The aperture 60 is adapted to permit the clearing discs to be connected to the axles of the residue coulter 10. The clearing discs 14 further include a plurality of fingered grooves 62 extending outwardly from the center of the aperture 60. The grooves 62 are designed to allow the passage of bolts therethrough to secure the clearing discs 14 to the mount structure 32.

The clearing discs 14 are designed to limit the relocation distance of the crop residue so that narrower seed row spacing can occur. Prior concave shaped clearing discs relocate debris at a distance great enough to create a thirty inch planting row whereas the flat clearing discs 14 of the present invention greatly reduce the debris relocation to less than half of the other clearing discs. Actual relocation distances are also dependant partially upon ground speed of the planter.

The clearing discs 14 are mounted ahead of depth gauge wheels 54 that are used to control the placement of the clearing discs 14 with respect to the soil and maintain placement over uneven terrain, as shown in FIG. 1. The clearing discs 14 are designed to be located closer to the gauge wheels 54 of the planter unit 12 for improved depth control.

Figure 10:
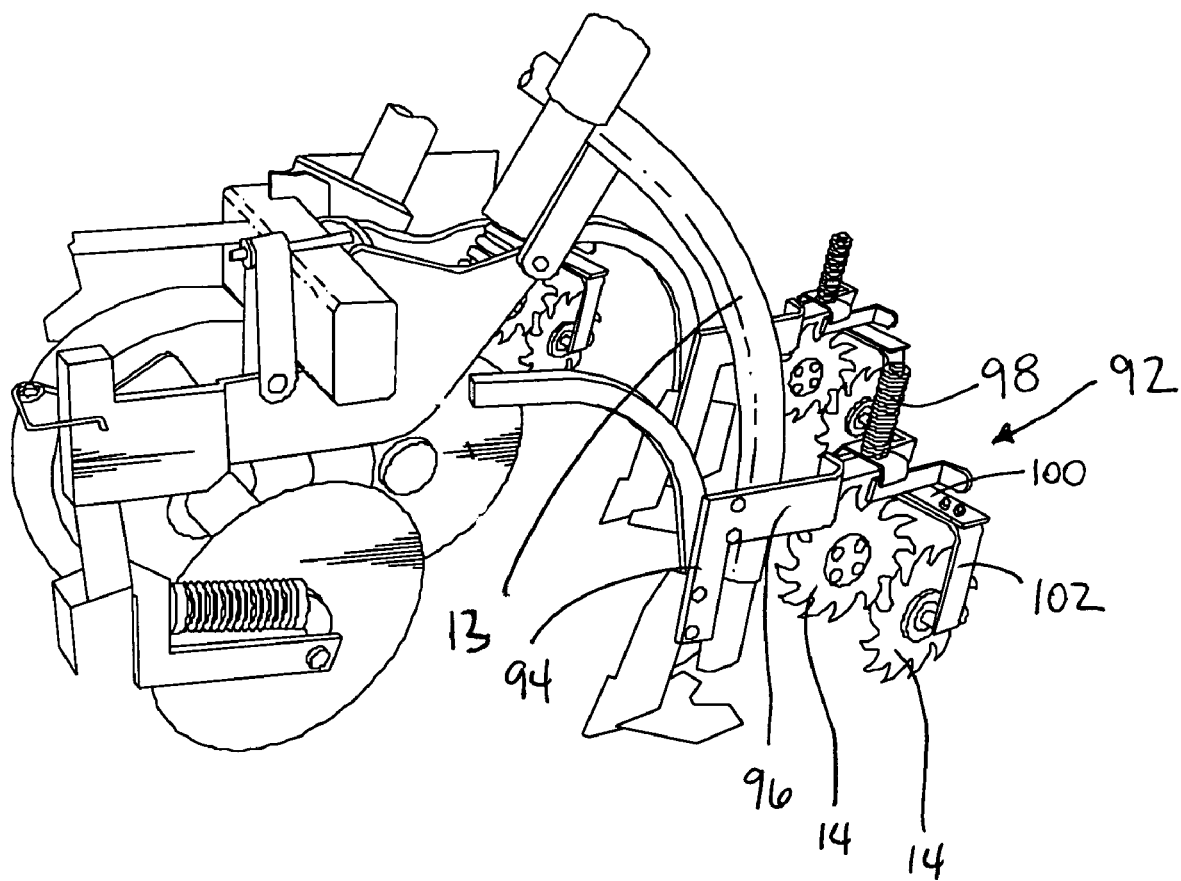
FIG. 10 is a perspective view of the clearing discs mounted for use on a trench closing device.

Alternatively, discs 14 may be arranged at the rear of the unit for use as a trench closing device 92. FIG. 10 illustrates the trench closing device 92 connected to a liquid manure injector 13 in accordance with the present disclosure. The trench closing device 92 is adapted to close the trench that had been created by the injector 13. The trench closing device 92 includes a support bracket 94 that is attached to the liquid manure injector 13. The support bracket 94 includes an arm 96 that extends in a rearward direction. The arm 96 includes a biasing mechanism 98 that assists in applying a downward force on the discs 14 to close the trench. The trench closing device 92 further includes a horizontal bar 100 that is perpendicularly oriented to the arm 96. Connected to the horizontal bar 100 is a pair of L-brackets 102. The L-brackets 102 extend downward and include apertures 104 that are adapted to accept the discs 14. The L-brackets 102 are oriented such that the discs 14 are oriented in a toe-out configuration. The amount of disc toe-out and distance between discs 14 can be altered by repositioning the L-brackets 102 on the horizontal bar 100.

While the concepts of the present disclosure have been illustrated and described in detail in the drawings and foregoing description, such an illustration and description is to be considered as exemplary and not restrictive in character, it being understood that only the illustrative embodiments have been shown and described and that all changes and modifications that come within the spirit of the disclosure are desired and protected.

There are a plurality of advantages that may be inferred from the present disclosure arising from the various features of the apparatus, systems and methods described herein. It will be noted that alternative embodiments of each of the apparatus, systems, and methods of the present disclosure may not include all of the features described yet still benefit from at least some of the inferred advantages of such features. Those of ordinary skill in the art may readily devise their own implementations of an apparatus, system, and method that incorporate one or more of the features of the present disclosure and fall within the spirit and scope of the invention as defined by the appended claims.

What is claimed is:

1. An apparatus for use with a farm implement, said apparatus comprising:
   a pair of substantially flat rotatable discs each having a first side and an opposing second side and each disc including a plurality of teeth extending from its periphery, each tooth having a profile consisting of a concave leading edge and a convex trailing edge with a substantially linear crown connecting said leading edge to said trailing edge and extending generally perpendicular to a radius of the respective disc; and
   wherein each of said teeth includes a beveled surface formed on one of said sides to create a cutting edge substantially along the length of said crown;
   said discs positionable with respect to each other so that a plane formed by said first disc intersects a plane formed by said second disc.

2. The apparatus of claim 1, wherein said discs are oriented to the field within ten degrees of vertical.

3. The apparatus of claim 1, wherein said crown includes a second beveled surface formed on the other one of said sides to form the cutting edge.

4. The apparatus of claim 1, including mounting means which is adapted to be attached to a planter.

5. The apparatus of claim 1, wherein said cutting edge of said teeth is adapted to engage and sever debris from a field.

6. The apparatus of claim 1, wherein said clearing discs are attached to the planter by a bracket assembly, said bracket assembly including a plurality of apertures adapted to accept a pin, said plurality of apertures permitting the vertical and lateral adjustment of said clearing discs with respect to a field.

7. A residue coulter device for use with a farm implement for clearing crop debris during forward movement of the farm implement, said residue coulter device comprising:
   an adjustable harness connectable to the farm implement;
   a pair of substantially flat rotatable clearing discs pivotally connected to said adjustable harness, said clearing discs each having a first side and an opposed second side and including a plurality of teeth extending from the periphery of said clearing discs, each tooth having a profile consisting of a concave leading edge a convex trailing edge and a substantially linear crown interconnecting said leading edge to said trailing edge and extending generally perpendicular to a radius of the respective disc;
   wherein each of said teeth includes a beveled surface on one of said sides to form a cutting edge substantially along the length of said crown.

8. The residue coulter device of claim 7, wherein said harness includes a biasing member to bias said clearing discs into the field.

9. The residue coulter device of claim 7, wherein said discs include a second beveled surface on the other one of said sides to form the cutting edge.

10. The residue coulter device of claim 7, wherein said cutting edge of said teeth is adapted to engage and sever debris in the field.

11. The residue coulter device of claim 10, wherein said adjustable harness permits the adjustment of the toe-out angle and spacing between said clearing discs.

12. A residue coulter apparatus for use with an agricultural planter for clearing crop debris from a path in a field during forward movement of the agricultural planter, said residue coulter apparatus comprising:
   an adjustable harness connectable to the farm implement;
   a pair of substantially flat rotatable clearing discs pivotally connected to said adjustable harness, said clearing discs each having a first side and an opposed second side and including a plurality of teeth extending from the periphery of said clearing discs, each tooth having a profile consisting of a concave leading edge and a convex trailing edge with a substantially linear crown connecting said leading edge to said trailing edge and extending generally perpendicular to a radius of the respective disc;
   a deflector positioned adjacent to said clearing discs to deflect the debris from the path in the field;
   each of said teeth including a beveled surface on one of said sides to form a cutting edge substantially along the length of said crown; and
   said clearing discs oriented with respect to each other so that said discs converge adjacent one another at the leading edge of said clearing discs.

13. The residue coulter of claim 12, wherein said clearing discs are oriented to the field within ten degrees of vertical.

14. The residue coulter of claim 12, wherein said adjustable harness includes an adjustment slide mechanism having an inclined plate that is adapted to be slid along a fixed inclined bracket to raise or lower said clearing discs.

15. The residue coulter of claim 12, wherein said cutting edge of said teeth is adapted to engage and sever the debris from the field.

16. The residue coulter of claim 12, wherein said adjustable harness includes a plurality of apertures adapted to accept a pin, said plurality of apertures adapted to permit vertical and lateral adjustment of said clearing discs with respect to the field.

17. A residue coulter apparatus for clearing debris from a path including:
   a support frame adapted to be attached to a movable vehicle;
   first and second rotatable ground engaging discs, each disc formed in a substantially flat shape and having a first side and an opposed second side;
   a first axle extending from said support frame, said first disc rotatably mounted on said first axle for rotation thereabout;
   a second axle extending from said support frame, said second disc rotatably mounted on said second axle for rotation thereabout;
   said first and second discs each lying in substantially vertical planes with respect to the ground but oriented such that said first vertical plane is at an acute angle; and
   a plurality of arcuate teeth extending from the periphery of each of said discs, each tooth having a profile consisting of a concave leading edge and a convex trailing edge with a substantially linear crown connecting said leading edge to said trailing edge and extending generally perpendicular to a radius of the respective disc, each tooth defining a cutting edge beveled on a lateral surface thereof, said cutting edge extending substantially along the length of the crown of each tooth.

18. The residue coulter apparatus of claim 17, wherein said discs are oriented to the field within ten degrees of vertical.

19. The residue coulter apparatus of claim 17, wherein said cutting edge of said teeth is adapted to engage and sever the debris from the field.

20. The residue coulter apparatus of claim 17, wherein said support frame includes a plurality of apertures adapted to accept a pin, said plurality of apertures adapted to permit vertical and lateral adjustment of said discs with respect to the field.

* * * * *